United States Patent [19]

Ward et al.

[11] 4,414,838
[45] Nov. 15, 1983

[54] WIND TUNNEL BALANCE CALIBRATOR

[75] Inventors: Frederick D. Ward; Claude Denis, both of Ste-Foy, Canada

[73] Assignee: Her Majesty the Queen in right of Canada, as represented by the Minister of National Defence, Ottawa, Canada

[21] Appl. No.: 360,556

[22] Filed: Mar. 22, 1982

[30] Foreign Application Priority Data

Apr. 22, 1981 [CA] Canada ................................. 375949

[51] Int. Cl.³ ............................................. G01L 25/00
[52] U.S. Cl. .................................................... 73/1 B
[58] Field of Search ............................ 73/1 B, 862.04

[56] References Cited

U.S. PATENT DOCUMENTS 3,233,452  2/1966  Jones ................................. 73/862.04
3,301,038  1/1967  Rich et al. ............................. 73/1 B

FOREIGN PATENT DOCUMENTS 832373  5/1981  U.S.S.R. ................................. 73/1 B

Primary Examiner—S. Clement Swisher
Attorney, Agent, or Firm—William R. Hinds

[57] ABSTRACT

A check calibration device for a sting-held strain-gauge wind tunnel balance to permit pre-test or inter-test checking of the calibration of the balance in a short time is provided. The device comprises a housing adapted to be secured rigidly to the sting. A plurality of actuators are secured to the housing. Each actuator is positioned to act to generate a force in a predetermined direction at a predetermined location on the body of the balance when the balance and housing are in position secured to the sting. The device further comprises means to vary the load force applied by each actuator. Means are also provided to determine the load force applied by each actuator at a particular point in time and to measure the behavior of the balance in response to that load force at that point in time. Such a device provides a relatively fast means to confirm the accuracy of the constants in the equations chosen to represent the actual behavior of the balance, thereby avoiding the necessity of having to recalibrate the balance unless such constants are shown to be inaccurate for the balance.

7 Claims, 3 Drawing Figures

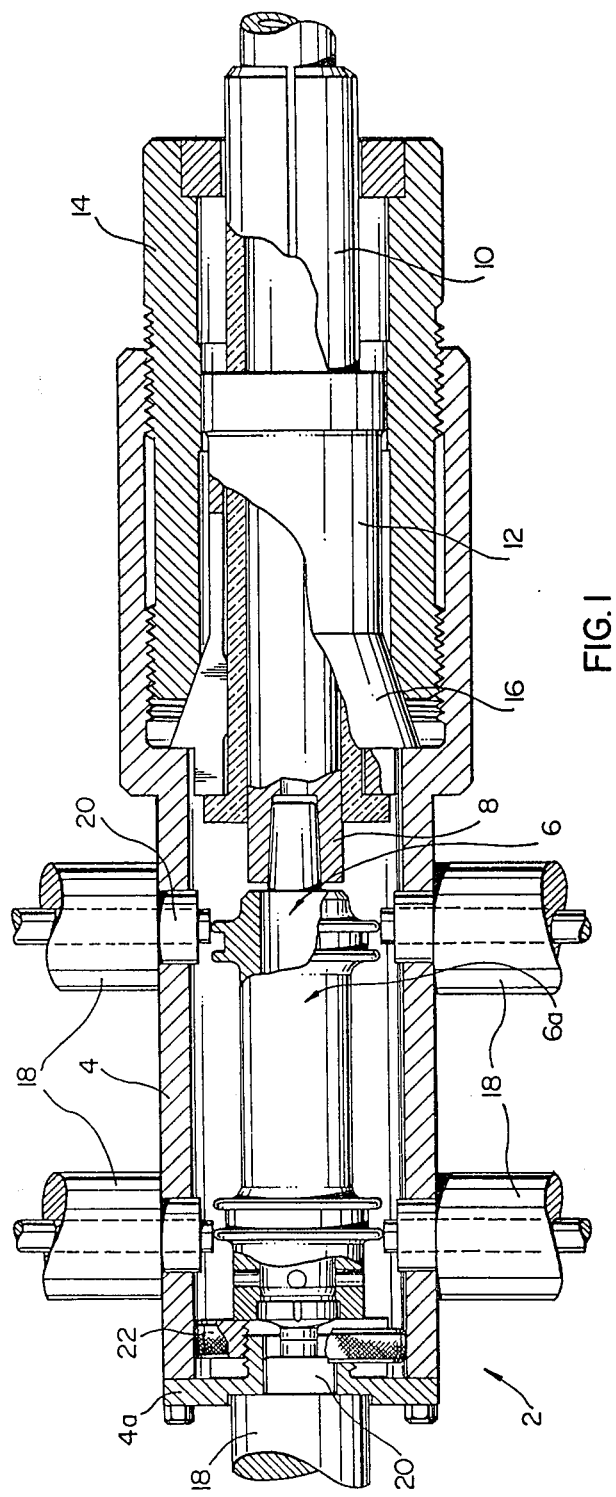

WIND TUNNEL BALANCE CALIBRATOR

BACKGROUND OF THE INVENTION

The present invention relates to a testing device for a wind tunnel balance, and more particularly relates to a check calibration device for a sting-held strain-gauge wind tunnel balance.

Extensive amounts of wind tunnel testing time are devoted to measurement of the aerodynamic forces and moments acting on a test model. To measure these forces and moments, the test model is supported by a balance. Wind tunnel balances can be classified into two types: "external" balances which are located outside the model and test section, and "internal" balances which are located inside the model or its supports, or which may be integral with the model (or a portion of it) or the support. A generally used type of internal balance takes the form of a metal cylinder which fits inside of and supports the test model. This cylinder, which typically may be of ½ inch diameter by 3 inches long, is itself supported at the rear by a "sting" which can be made to change the attitude of the model. The balance itself is a complex assembly of strain-gauged elements arranged to sense directional and rotational forces acting on the model which it supports, the electronic signals from which elements may be fed to a computer to give a rapid readout. Careful calibration of the balance used to measure these forces is necessary to obtain the best possible accuracy, the objective being the determination of the constants in the equations chosen to represent the actual behavior of that particular balance. In a test environment, these equations are solved to provide the forces and moments corresponding to the recorded measurements. Balances may be damaged by aerodynamic overload or handling errors, and the initial calibration thereof should therefore be checked frequently.

The current method of checking the calibration of such a balance is to remove the balance from the tunnel and to mount it on an external calibration rig where incremental forces, generated by accurate weights, may be applied in the several modes, and the resultant electrical outputs measured. This is a tedious and time consuming process. In some larger tunnels it is customary to assembly a rig around the balance in situ. In addition to causing downtime of the tunnel, the handling of large weights in the tunnel can represent a problem. In either case, a full calibration of the balance may occupy two persons for two days.

There has been described another apparatus and method, designed for a large wind tunnel as a highly accurate standard for calibrating strain-gauge balances, comprising pneumatically powered force generators controlled by a computer, capable of generating any combination of loads in response to an input demand originating from a manually operated switchboard or from a stored programme. A large number of discrete load conditions are thereby imposed, requiring typically a calibration time of 12 hours. In that such apparatus must be restrained by the tunnel walls, allowance must be made for deflection of the sting.

It is an object of the present invention to provide an apparatus for testing the calibration of a device which will provide a less tedious and time consuming method of checking the calibration of a sting-held strain-gauge wind tunnel balance than the aforementioned method. It is a further object of the present invention to provide such an apparatus which will enable the checking of the calibration of such a balance in situ in the wind tunnel, such apparatus not being supported by the walls of the tunnel. It is yet a further object to provide a check calibration device for a balance which can indicate whether or not the calibration of the balance is accurate without having to completely recalibrate the balance.

SUMMARY OF THE INVENTION

According to the present invention, a check calibration device for a sting-held strain-gauge wind tunnel balance to permit pre-test or inter-test checking of the calibration of the balance in a short time is provided. The device comprises a housing adapted to be secured rigidly to the sting. A plurality of actuators are secured to the housing. Each actuator is positioned to act to generate a load force in a predetermined direction at a predetermined location on the body of the balance when the balance and housing are in position secured to the sting. The device further comprises means to vary the load force applied by each actuator. Means are also provided to determine the load force applied by each actuator at a particular point in time and to measure the behavior of the balance in response to that load force applied by each actuator at that point in time.

In a preferred embodiment of the invention, actuators are provided to act in the axial direction of the balance towards the sting, and in predetermined directions normal to the axial direction of the balance and at 90° angles to each other so that check loading may be carried out in respect of normal and side forces and one axial force. The actuators are pneumatic thrust units of the rolling diaphragm type. Electronic signals from the balance in response to forces applied by the actuator are fed to a computer for comparison with expected electronic signals from the balance in response to such forces.

Since the housing is held by the sting, directions of the imposed forces are not modified by deflection of the sting. The check calibration using the device of the present invention may be performed quickly, i.e. in a matter of minutes. It should be noted that the procedure is intended as a secondary standard, i.e. as a check that no appreciable alteration has occurred during the test.

BRIEF DESCRIPTION OF THE DRAWINGS

Other objects and advantages of the invention will become apparent upon reading the following detailed description and upon referring to the drawings in which:

FIG. 1 is a partial section side view of a check calibration device according to the present invention, mounted on a sting about a balance;

In the drawings similar features have been given similar reference numerals.

DETAILED DESCRIPTION OF THE DRAWINGS

Figure 3:
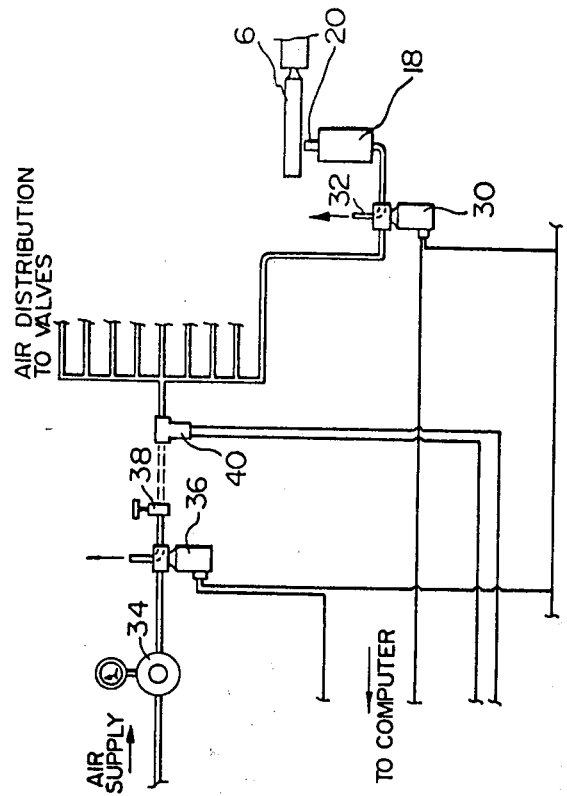
FIG. 3 is a schematic drawing of a system for check calibrating a sting-held strain-gauge wind tunnel balance using a check calibration device according to the present invention.

Turning to FIG. 1, there is shown a side view, in partial section, of a check calibration device 2 according to the invention having a housing 4, of tubular shape, fitted over a balance 6, the calibration of which is to be checked. Balance 6 is surrounded by a special sleeve 6a which ensures that forces are applied at the appropriate pentres. Balance 6 is secured to sting 8 in a usual manner, while housing 4 is secured to sting 8 by means of collar and sting adapter 10 which fits within a spring collar 12. Both adapter 10 and collar 12 are split longitudinally so that tightening mandrel 14 into housing 4 causes radial contraction of conical portion 16 of collar 12 and consequent contraction of adapter 10 to effect a firm lock between housing 4 and sting 8.

Figure 2:
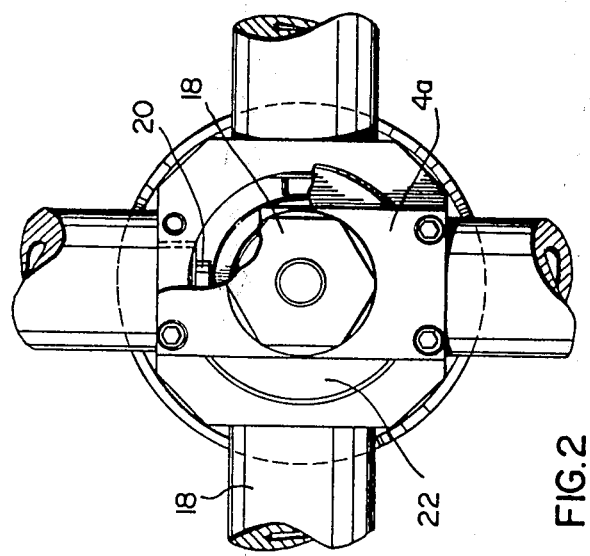
FIG. 2 is an end view of the device of FIG. 1.

To housing 4 are secured actuators 18, being pneumatic thrust units of the rolling diaphragm type, which have inherently low friction characteristics. Rods 20 of actuators 18 act as required through appropriate apertures in housing 4 on the sleeve 6a of balance 6 at specified force centers. Selective application of loads through rods 20 of thrust units 18 on the body of balance 8 can be achieved, as will be described hereinafter, by means of suitable valving of these thrusters. As can be seen in FIGS. 1 and 2, one thruster acts in the axial direction of the balance towards the sting, and spaced pairs of thrusters act in directions normal to the axial direction of the balance, the pairs being positioned at 90° angles to each other. In this manner check loading may be carried out in all sideways directions and normal directions, and in one axial direction. It has been found that BELLOFRAM (trade mark) small bore diaphragm air cylinders serve as appropriate thrust units 18. They achieve minimal friction and have been found to give a maximum force of 48 pounds at a rate of maximum pressure of 25 psi.

The thrust unit 18 positioned to apply load in the axial direction is supported by housing and support 4a and guided in its action by positioning plug 22.

There is illustrated schematically in FIG. 3 an appropriate valving system for thrust units 18. Each thrust unit 18 is pressurized through a three way valve 30 having a vent 32, pressure from the air supply being fed to valve 30 through a regulator valve (for maximum pressure) 34, three way valve 36, needle valve 38 and pressure transducer 40. Using such a system, any of thrusters 18 can be loaded continuously from 0 to a preset maximum. Knowing the relationship between applied pressure and actual resultant load applied on sleeve 6a by rod 20 for each thrust unit 18, a computer is programmed to plot charts of load versus resultant signal received from balance 6. In the arrangement illustrated in the drawings, measurements of normal, side and positive axial outputs are possible, with pitch and yaw moments. As well, measurements of rolling moment could be obtained, with appropriate design modification to the arrangement as described and illustrated.

The fact that housing 4 is secured to the sting instead of the walls of the wind tunnel, so that there are negligible sting deflections, significantly simplifies the operation and derivation of useful results using the device according to the present invention. This device simply and quickly permits a check of the calibration of the balance, although, as previously mentioned, it is intended for use strictly as a secondary standard, i.e. to check that no appreciable alteration has occurred to the constants of a balance. As well, it permits continuous loading as opposed to the tedious and time consuming processes now commonly used, of adding incremental forces generated by accurate weights or force generators and actually recalibrating the balance to confirm the accuracy of the constants for the balance.

Thus it is apparent that there has been provided in accordance with the invention a check calibration device for a sting-held wind tunnel balance that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

The embodiments of the invention in which an exclusive property or privilege is claimed are defined as follows:

1. A check calibration device for a sting-held wind tunnel balance comprising:
   (a) a housing adapted to be secured rigidly to the sting;
   (b) a plurality of actuators secured to the housing, each positioned to act to generate a load force in a predetermined direction at a predetermined location on the body of the balance when the balance and housing are in position secured to the sting;
   (c) means to vary the load force applied by each actuator;
   (d) means to determine the load force applied by each actuator at a particular point in time;
   (e) means to measure the behavior of the balance in response to the load force applied by each actuator corresponding to that point in time.

2. A device according to claim 1 provided with actuators to act in the axial direction of the balance towards the sting, and in predetermined direction normal to the axial direction of the balance and at 90° angles to each other, so that check loading may be carried out in respect of normal and side forces and one axial force.

3. A device according to claim 2 provided with two spaced actuators to act in each of the predetermined directions normal to the axial direction of the balance.

4. A device according to claim 1, 2 or 3 wherein the actuators are pneumatic thrust units.

5. A device according to claim 1 wherein the actuators are pneumatic thrust units of the rolling diaphragm type.

6. A device according to claim 5 wherein a means is provided to vary the pressure supplied to each thrust unit, this means comprising a solenoid operated air valve in each feed line to each pneumatic thrust unit.

7. A device according to claim 1 further provided with a computer means to which electronic signals from the balance in response to load forces applied by the actuator are fed for comparison with expected electronic signals from the balance in response to such forces.

* * * * *